(12) United States Patent
John et al.

(10) Patent No.: US 7,953,079 B2
(45) Date of Patent: May 31, 2011

(54) METHOD AND APPARATUS TO CONTROL ACCESS TO CONTENT

(75) Inventors: Sunil Shashikanthan John, San Jose, CA (US); Michael Edric Tasker, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 425 days.

(21) Appl. No.: 11/810,134

(22) Filed: Jun. 4, 2007

(65) Prior Publication Data

US 2008/0298358 A1 Dec. 4, 2008

(51) Int. Cl.
*H04L 12/56* (2006.01)

(52) U.S. Cl. ...................................... 370/389

(58) Field of Classification Search .................. None
See application file for complete search history.

(56) References Cited

U.S. PATENT DOCUMENTS

| | | | |
|---|---|---|---|
| 6,400,996 B1 * | 6/2002 | Hoffberg et al. ............... | 700/83 |
| 7,080,039 B1 * | 7/2006 | Marsh ............................ | 705/51 |
| 7,437,772 B1 * | 10/2008 | Thenthiruperai et al. ...... | 726/30 |
| 2002/0126991 A1 * | 9/2002 | Kawamura et al. ............. | 386/70 |
| 2003/0236912 A1 * | 12/2003 | Klemets et al. ................ | 709/236 |
| 2005/0100113 A1 * | 5/2005 | Corts et al. .................... | 375/295 |
| 2005/0216941 A1 * | 9/2005 | Flanagan et al. ............... | 725/88 |
| 2006/0130118 A1 * | 6/2006 | Damm ............................ | 725/135 |
| 2006/0210084 A1 * | 9/2006 | Fransdonk ..................... | 380/278 |
| 2007/0061831 A1 * | 3/2007 | Savoor et al. ................... | 725/13 |
| 2007/0156900 A1 * | 7/2007 | Chien ............................ | 709/225 |
| 2007/0157221 A1 * | 7/2007 | Ou et al. ......................... | 725/10 |
| 2007/0250715 A1 * | 10/2007 | Cai et al. ........................ | 713/176 |
| 2008/0134249 A1 * | 6/2008 | Yang et al. ...................... | 725/46 |
| 2008/0168490 A1 * | 7/2008 | Yu ................................. | 725/32 |

* cited by examiner

*Primary Examiner* — Chirag G Shah
*Assistant Examiner* — Salvador E Rivas (57) ABSTRACT

The present invention provides a method, apparatus and computer program product for accessing content via a packet-switched network based on a content access policy. The content is marked with a rating. The rating is extracted from the content, to verify conformance with the content access policy. On verification of the conformance between the rating and the content access policy, access to the marked content is provided.

28 Claims, 11 Drawing Sheets

METHOD AND APPARATUS TO CONTROL ACCESS TO CONTENT

FIELD OF THE INVENTION

The present invention generally relates to access control for digital content delivered over a packet switched network.

BACKGROUND OF THE INVENTION

A wide variety of content is available in digital form over packet-switched networks such as the Internet, Local Area Networks (LAN), Metropolitan Area Networks (MAN), Wide Area Networks (WAN), and the like. Such content may include, for example, audio-visual content or audio content, such as Internet Protocol Television (IPTV) programs, Internet Video, Internet Radio programs, online jukeboxes, and Video-on Demand.

In many cases, the content may be deemed inappropriate or undesirable for certain audiences. For example, certain content may be inappropriate for viewing by children. Further, some content may be considered undesirable for viewing in an office environment. Presently, it is often either cumbersome or impossible to control access to a given type of content.

Some of the traditional technologies used to control access to content include cryptographic and authentication techniques. However, with these technologies, the access-restriction may not necessarily be based on the type of content.

Conventional technologies for content-based access restriction may include age-based restriction. For example, cable televisions may be programmed to block/restrict content based on certain ratings that are governed by a viewer's age. The ratings are provided to guide the viewers about the type of content.

Further, some restriction/blocking systems may provide age-based restriction for content that is delivered through packet-switched networks. For example, Internet Protocol Television (IPTV) service providers provide a dedicated set top box connected to the TV. The set top box decodes the picture encoding of information for the video and restricts the access. Other systems put the restriction/control information into the guide data and the set top box deals with the access control. However, the set top box is prone to tampering and is less reliable. Also, in these systems, the inappropriate content is blocked or restricted at the set top box.

OVERVIEW

The present invention is directed to a method for accessing content via a packet-switched network based on a content access policy. The method includes receiving the content marked with a rating. Thereafter, the rating is extracted from the marked content. The extracted rating is then verified to be in conformance with the content access policy. Access to the marked content is provided on verification of the conformance between the rating and the content access policy.

In an embodiment, the present invention provides a method for providing the content information of a data packet. The data packet is delivered via a packet-switched network. The method includes identifying the content of the data packet. Thereafter, a rating is selected based on the content of the content. The data packet is then marked with the rating.

DETAILED DESCRIPTION

In the foregoing specification, specific embodiments of the present invention have been described. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

The present invention advantageously provides methods, apparatuses and a computer program product to provide access to content via a packet-switched network based on a content-access policy. In various embodiments of the present invention, the content is provided by a content distributor to one or more content consumers via the packet-switched network. The content distributor marks the content data packets with a rating associated with the content. Various embodiments of the present invention allow a content consumer to access the content only when the rating associated with the content conforms to the content access policy for the content consumer.

Figure 1:
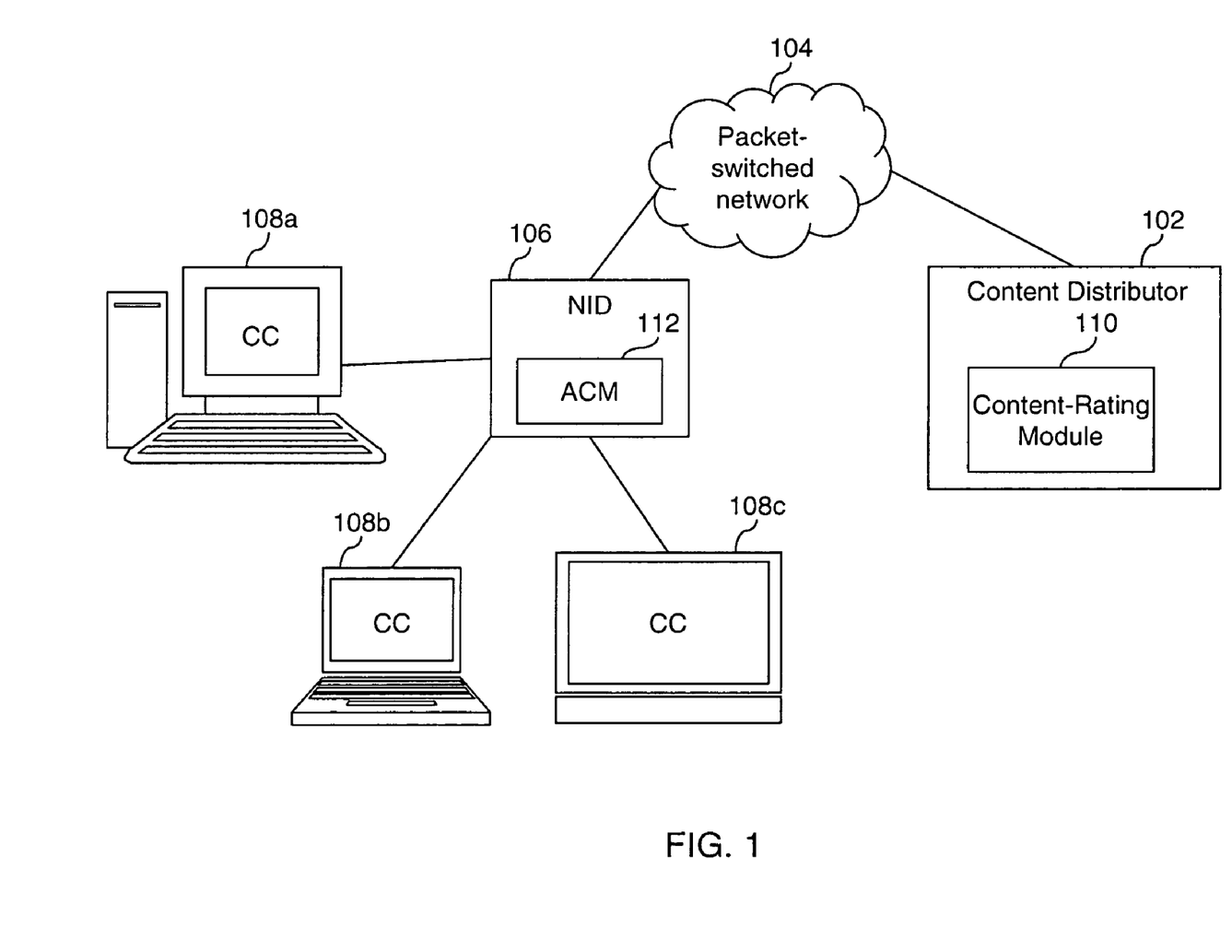
FIG. 1 illustrates an overview of an embodiment of the present invention depicting the delivery of content over a packet-switched network to various content consumers.

FIG. 1 illustrates an overview of an embodiment of the present invention depicting the delivery of content over a packet-switched network to various content consumers. The overview illustrates a content distributor 102, a packet-switched network 104, a network infrastructure device (NID) 106, and content consumers (CC) 108a, 108b, and 108c. Content distributor 102 includes a content-rating module 110. Network infrastructure device 106 includes an access-control module (ACM) 112. Content distributor 102 and network infrastructure device 106 are connected to packet-switched network 104. Network infrastructure device 106 is further connected to one or more content consumers 108. As an example, the present invention is described with the help of three content consumers 108a, 108b, and 108c.

In one embodiment, content distributor 102 distributes content via packet-switched network 104. The content is marked with a rating by content-rating module 110. The marked content is then distributed via packet-switched network 104 by content distributor 102. Network infrastructure device 106 receives the marked content from packet-switched network 104. Access-control module 112 delivers the content to content consumers 108 if the rating of the marked content conforms to the content access policy.

In an embodiment of the present invention, the content includes video content, audio content, and/or audio-visual content. In an embodiment of the present invention, the content is delivered in form of data packets, which preferably includes a header, a data portion and an optional trailer. Further, the content may be delivered in the form of a packetized stream, such as, a transport stream. The transport stream is in a format specified in for example, Moving Picture Experts Group—2 (MPEG-2), Moving Picture Experts Group—4 (MPEG-4), and International Telecommunication Union—Telecommunication Standardization Sector (ITU-T) H.264/Advanced Video Coding (AVC). In various embodiments of the present invention, the content is delivered to the content consumers 108 via packet-switched network 104 using multicasting, unicasting, or other known delivery methods.

Content distributor 102 may also provide guides and links to content from different sources. In an embodiment of the present invention, the rating is marked on the data packet carrying the content. Content-rating module 110 is described in conjunction with FIG. 2. In various embodiments of the present invention, the content distributor 102 may be, by way of non-limiting example, an Internet Protocol Television (IPTV) service provider (such as Verizon's FiOS TV, SureWest Digital Television, or MSTARmetro InfiniteChoice Television), a video-on-demand server, a streaming and/or downloadable multimedia file server on the Internet, and the like. While various embodiments of the present invention have been illustrated using audio/video content, it would be apparent to one skilled in the art that the teachings of the present invention may be employed for controlling access to any content delivered over a packet-switched network.

Packet-switched network 104 is connected to the content distributor 102 and the network infrastructure device 106. In an embodiment of the present invention, the packet-switched network 104 is the Internet. In another embodiment, packet-switched network 104 is a Metropolitan Area Network (MAN). In yet another embodiment, packet-switched network 104 is a Wide Area Network (WAN). Further, in various embodiments of the present invention, packet-switched network 104 may be, for example, an Internet Protocol (IP) network such as IPv4 network and IPv6 network, an Asynchronous Transfer Mode (ATM) network, a Digital Subscriber Line (DSL) network, or a digital cable television (CATV) network. It would be apparent to one skilled in the art that the teachings of the present invention are applicable to delivery of content via any packet-switched network without limitation.

Network infrastructure device 106 connects content consumers 108 to packet-switched network 104. In an embodiment of the present invention, network infrastructure device 106 receives content in form of data packets from a packet-switched network 104 and forwards the received data packets to content consumers 108. The access-control module 112 at the network infrastructure device 106 is capable of filtering the data packets on the basis of rating marked on the data packets. The access-control module 112 is further described in conjunction with figures below. In an embodiment of the present invention, network infrastructure device 106 is an edge router that connects content consumers such as content consumers 108 to a packet-switched network 104. In various embodiments of the present invention, network infrastructure device 106 can be a security appliance such as Cisco access routers 800, 1800, PIX firewall, a home router, a set top box, a satellite receiver, a wireless network device etc.

Content consumers 108 may include devices that are capable of connecting to packet-switched network 104. Examples of content consumers 108 includes a Personal Computer (PC), a Laptop, an IP phone, a wireless device, a television set with a set top box, and the like. However, it would be apparent to one skilled in the art that content consumers 108 can have an alternative form. Alternative forms of content consumers 108 are deemed to lie within the spirit and scope of the present invention.

Figure 2:
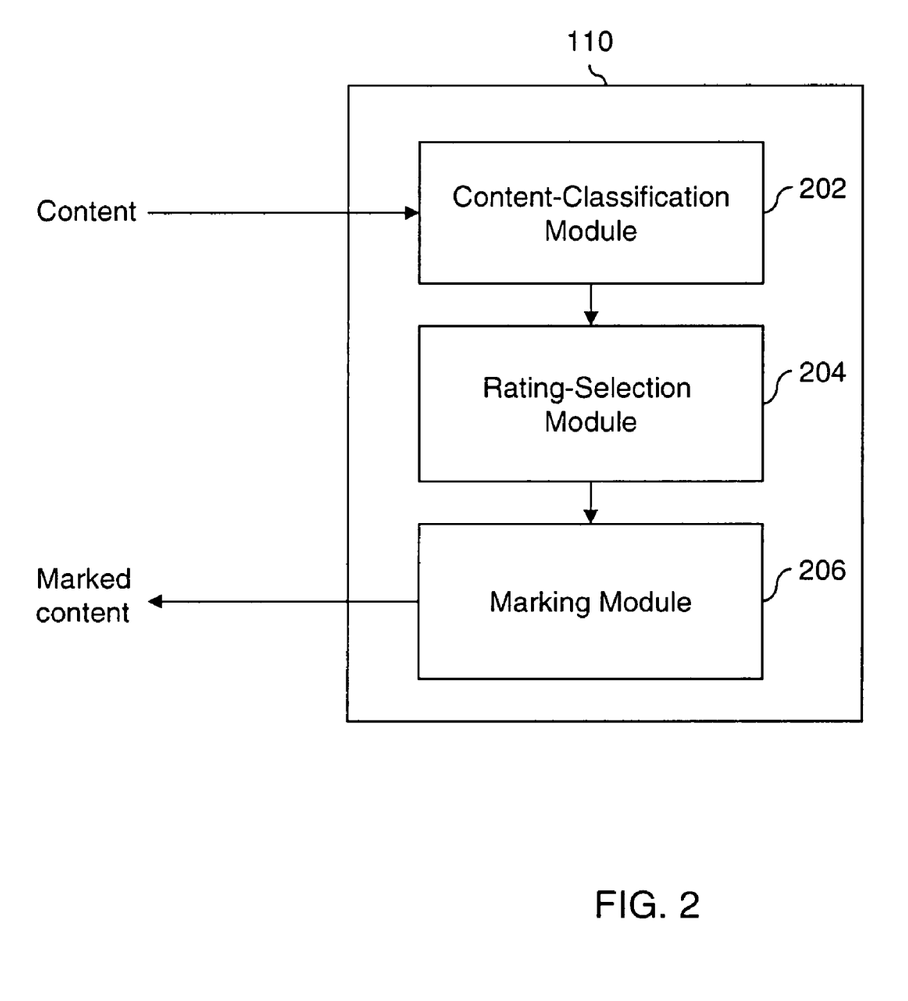
FIG. 2 shows a functional block diagram of an apparatus for marking a data packet delivered via a packet-switched network, in accordance with an embodiment of the present invention.

FIG. 2 shows a functional block diagram of a content-rating module 110 for marking a data packet delivered via packet-switched network 104, in accordance with an embodiment of the present invention. Content-rating module 110 includes a content-classification module 202, a rating-selection module 204, and a marking module 206. The content-classification module 202 classifies the type of content in the data packet. The rating-selection module 204 selects a rating based on the type of content. The marking module 206 marks the data packet with the rating.

In an embodiment of the present invention, content-classification module 202 classifies the type of content while the content is created at a content source. In another embodiment of the present invention, content-classification module 202 provides for manual analysis of the content to classify the content. In an embodiment of the present invention the content is audio and video content, such as news clip, a movie, an audio song, and the like. In various embodiments of the present invention, the content-classification module 202 includes speech-recognition tools, text-recognition tools, and image processing tools for content classification. In still another embodiment of the present invention, the content-classification module 202 classifies live content based on the content broadcast time. For example, in case of a live television broadcast over Internet, different programs with different type of contents are broadcasted as per a pre-defined schedule or television program guide.

Further, content-classification module 202 may employ a combination of the aforementioned approaches to classify the content. For example, while content may initially be classified using a pre-defined television program guide, last minute content choice decisions that deviate from the pre-defined television program guide may be classified manually and/or using speech recognition, text recognition, or image processing techniques. Further, in an embodiment of the present invention, the content may be divided into sub-sections containing different types of content. For example, content broadcast by a news channel may be divided in to sub-sections of news clips. News clips pertaining to different types of news may be classified as different content such as "News/World/Current Affairs" and "News/USA/IL/Chicago/Weather". Still further, content under a single classification may have a different rating at different times. For example, weather-related news content may be suitable for general viewing at most times except, for example, explicit footage of natural disasters. Various embodiments of the present invention allow dynamic classification of each sub-section of content.

In an embodiment of the present invention, the rating-selection module 204 selects a rating based on the classification of the content, as identified by a content-classification module 202. In another embodiment of the present invention, the rating-selection module 204 selects the rating based on the type of content and the community of content consumers 108 to which the content is delivered. Further, the content rating can be re-selected and re-marked when the content is provided to content consumers 108 of the community to enforce this community-based content rating. In an embodiment of the present invention, rating-selection module 204 selects a TV rating, a content description or both for the data packet. The TV ratings may include, but are not limited to, TVY, TVG, TVPG, and TVMA. The content description includes information about the content. For example, if the content is a news clip, the content description may describe the content as a news event. The content description can also include the date, time and location of the news event. In an embodiment of the present invention, rating-selection module 204 includes a mapping table for mapping the type of content to the rating.

In an embodiment of the present invention, marking module 206 stores the rating in the data packet header. The data packet header may include the length of the packet header, the length of the data packet, the source network address, the destination network address, the source port, the destination port, and the transport protocol such as User Datagram Protocol (UDP), Transmission Control Protocol (TCP), and Real-time Transport Protocol (RTP).

In an embodiment of the present invention, the marking module 206 encodes the rating in the numeric fields of the data packet header. The numeric fields include source port number, destination port number, source network address, and destination network address. In one embodiment of the present invention, the rating is encoded into the numeric value of the source port number. For example, if the source port number is in the 1000-2000 range then the content description is "sports" where 1001 is football, 1002 is baseball etc. In another embodiment of the present invention, the rating is encoded in the source network address. For example, if the source network address is marked as x.x.x.1 then the content is TVPG, whereas, if the source network address is marked as x.x.x.2 the content is TVPG13. In yet another embodiment of the present invention, the source port number that is 16-bit is sub-divided such that the most significant 3 bits encode the TV rating and the least significant 13 bits encode the content description. In various embodiments of the present invention, the rating is encoded such that the TV-rating, the content description, or both, are encoded across the source port number, the destination port number, the source network address, and the destination multicast network address.

In another embodiment of the present invention, the rating is dynamically encoded in the numeric values of the numeric fields. The numeric values in the header that correspond to the rating are dynamic and change with time. Further, the dynamic mapping of the numeric values to the rating may be stored in a database. The database is described in conjunction with FIG. 4.

In an embodiment of the present invention, wherein the content is multicasted, the destination address, source address, and port numbers can be used to encode the rating. In another embodiment of the present invention, wherein the content is unicasted, the payload includes a RTP header. The rating is thereby encoded within the RTP Synchronization Source (SSRC) field. In another embodiment of the present invention, the marking module 206 encodes the rating in text-fields of the data packet. For example, in various embodiments, a 'trailer' that contains text such as 'TVG', and 'TVPG13' may be added to the data packet carrying the content. In yet another embodiment of the present invention, a separate text formatted header that lists the content in hierarchical form, such as 'sports/football/49ers' or 'Olympic/2006/Winter/Ski/Women', is included in the data packet. In an embodiment of the present invention, marking module 206 is a content encoder.

In an embodiment of the present invention, various components of content-rating module 110 are located at content distributor 102. In another embodiment of the present invention, the components are located at the source of the content. In yet another embodiment of the present invention, the content-classification module 202 is located at the source of the content and other components of content-rating module 110 are located at content distributor 102.

Figure 3:
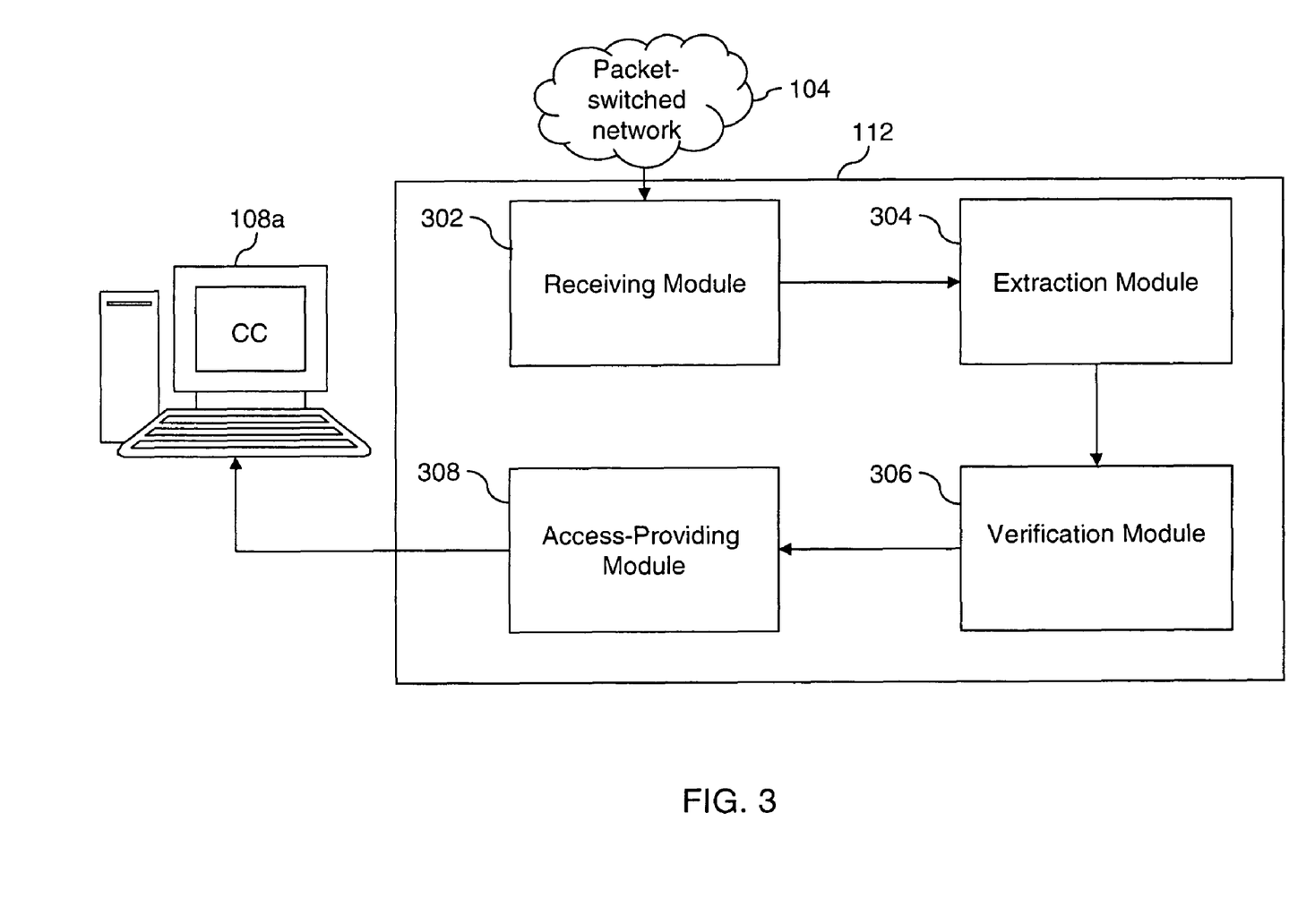
FIG. 3 shows a functional block diagram of an apparatus for providing content access to a content consumer based on a content access policy via the packet-switched network, in accordance with an embodiment of the present invention.

FIG. 3 shows access-control module 112 for providing content access to a content consumer based on a content access policy via packet-switched network 104, in accordance with an embodiment of the present invention. Access-control module 112 includes a receiving module 302, an extraction module 304, a verification module 306, and an access-providing module 308. Access-control module 112 is depicted connected to the content consumer, for example content consumer 108a. Access-control module 112 can be, for example, a set top box.

Content distributor 102 delivers the content in form of a packetized stream via packet-switched network 104 directed to the network address of content consumer 108a. The packetized stream includes data packets. Every data packet in the packetized stream is marked with a rating corresponding to the content. The data packets are received by receiving module 302. Extraction module 304 extracts the rating from the marked data packet. The extracted rating is then provided to verification module 306. Verification module 306 verifies that the rating conforms to the content access policy for the addressed content consumer, in this case, content consumer 108a. If the rating is found to be in conformance with the content access policy for content consumer 108a, the marked data packet is forwarded to access-providing module 308. Access-providing module 308 provides content consumer 108a access to the data packet.

In an embodiment of the present invention, receiving module 302 is a standard router/firewall software, hardware or firmware.

In an embodiment of the present invention, extraction module 304 checks if the data packet is marked, identifies the marking scheme used to mark the data packet, and extracts the rating of the content of the data packet. The extraction module 304 may include filters and masks to extract the rating from the marked data packet. Further, extraction module 304 may also include filters and masks to identify whether the received data packet is marked or not. In another embodiment of the present invention, extraction module 304 identifies the marked data packet and extracts the rating from the marked data packet by querying content distributor 102. Content distributor 102 provides the rating of the marked data packet if the data packet is marked with a rating. Otherwise, if the data packet is not marked, no response to the query is provided.

In an embodiment of the present invention, verification module 306 includes an associative array that maps network address of content consumer 108a to the content access policy. Further, the associative array provides a lookup functionality to look for the extracted rating in the content access policy.

Figure 4:
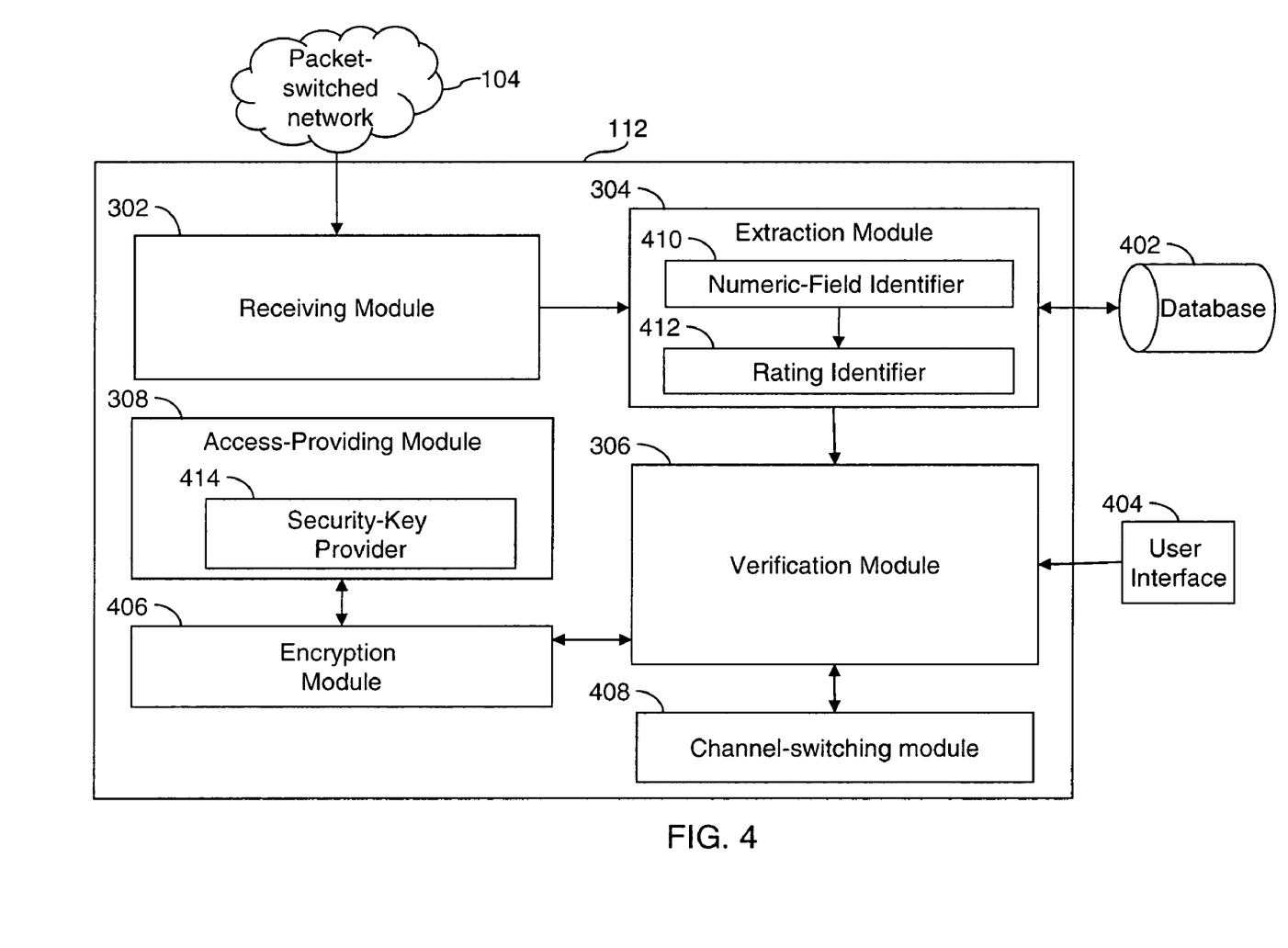
FIG. 4 shows a functional block diagram of apparatus for providing content access to a content consumer based on a content access policy via the packet-switched network, in accordance with another embodiment of the present invention.

FIG. 4 shows a functional block diagram of access-control module 112 for providing content access to a content consumer, for example content consumer 108a based on a content access policy via a packet-switched network 104, in accordance with another embodiment of the present invention. Access-control module 112 may be, for example, a set top box. Access-control module 112 includes receiving module 302, extraction module 304, verification module 306, access-providing module 308, a database 402, a user interface 404, an encryption module 406, and a channel-switching module 408. Extraction module 304 further includes a numeric-field identifier 410 and a rating identifier 412. Access-providing module 308 further comprises a security-key provider 414.

Receiving module 302 receives the marked data packet via packet-switched network 104 from content distributor 102. The marked data packet is then forwarded to extraction module 304. At extraction module 304, numeric-field identifier 410 identifies the numeric fields in the marked data packet where the rating has been encoded. In an embodiment of the present invention, the numeric fields are static for a content source. In another embodiment of the present invention, the numeric fields are dynamic and may be updated by content distributor 102. In an embodiment of the present invention, numeric-field identifier 410 includes masks to identify the fields in the header of the market data packet where the rating has been encoded. In another embodiment of the present invention, numeric-field identifier 410 obtains information about the numeric fields periodically by querying content distributor 102.

A website is provided at content distributor 102 to receive a query from numeric-field identifier 410 and send the information about the numeric fields where the rating has been encoded. Numeric-field identifier 410 forwards the information about the identified numeric fields to rating identifier 412. Rating identifier 412 looks up the numeric values of the identified numeric fields to identify the rating of the marked data packet. In an embodiment of the present invention, rating identifier 412 includes filters and masks to extract the numeric values of the numeric fields identified by numeric-field identifier 410.

Database 402 provides rating identifier 412 with a mapping of the numeric values of the identified numeric fields to the rating. In an embodiment of the present invention, database 402 can be a dynamic database where the mapping of numeric values of the identified numeric fields to the rating changes with time. In another embodiment of the present invention, database 402 is a content addressable database. In yet another embodiment of the present invention, database 402 is provided by a web service wherein database 402 may be periodically delivered as content to content consumers 108.

In various embodiments of the present invention, the numeric fields in the header of the marked data packet include source port number, destination port number, source network address, and destination network address. After identification of the rating of the marked data packet, the rating is extracted at extraction module 304. Thereafter, the extracted rating is provided to verification module 306. Verification module 306 verifies that the rating is in conformance with the content access policy for content consumer 108a. User interface 404 is connected to verification module 306 to configure the content access policy. In an embodiment of the present invention, user interface 404 is a Graphical User Interface (GUI) as illustrated in conjunction with FIG. 5. In another embodiment of the present invention, user interface 404 is a Command Line Interface (CLI). In an embodiment of the present invention, user interface 404 can be used to define and save the defined content access policies at content consumer 108a.

Further, various embodiments of the present invention allow selecting predefined content access policies for content consumers 108. In an embodiment of the present invention, the predefined ratings are age-based such as 'Child', 'Adolescent', 'Adult', 'Senior Citizen', and the like. In another embodiment of the present invention, the predefined ratings are profession-based such as 'Salesperson', 'Manager', 'Stock Broker', 'Trader', 'Analyst' and the like. If the rating of the marked data packet is in conformance with the content access policy at verification module 306, the marked data packet is forwarded to encryption module 406. Encryption module 406 encrypts the marked data packet by adding a security key. In an embodiment of the present invention, encryption module 406 includes a public security key encryption technique to encrypt the content.

In an embodiment of the present invention, the encryption may allow for pay-per-view access to content whereby the security key is dynamic with respect to time, and content consumers 108 have to purchase a decryption key via public-switched network 104. In another embodiment of the present invention, a non-encrypted trailer of the content may be provided to encourage content consumers 108 to purchase the decryption key. The encrypted data packet is then forwarded to access-providing module 308. Security-key provider 414 at access-providing module 308 provides the security key to content consumer 108a, so that the user at content consumer 108a is capable of decrypting the marked data packet and accessing the content of the marked data packet. However, if the rating of the marked data packet is not in conformance with the content access policy, the marked data packet is dropped in an embodiment of the present invention. In another embodiment of the present invention, channel-switching module 408 switches to an alternate content provided by content distributor 102, if the rating of the marked data packet is not in conformance with the content access policy. Channel-switching module 408 switches to the alternate content such that packetized stream carrying the alternate content includes marked data packets with a rating conforming to the content access policy for content consumer 108a.

In an embodiment of the present invention, the content access policy is different for content consumer 108a, content consumer 108b, and content consumer 108c. Therefore, the user with rights to define the content access policy for the content consumers 108 defines the content access policy separately for content consumer 108a, content consumer 108b, and content consumer 108c. In another embodiment of the present invention, the content access policy is same for content consumer 108a, content consumer 108b, and content consumer 108c. Hence, the user can define a common content access policy for a group comprising content consumers 108.

In an embodiment of the present invention, the content access policy for content consumer 108a includes a priority list of content description, and further includes a condition that the available content with highest priority has to be provided to content consumer 108a. Hence, the ratings of marked data packets of all the available content at content distributor 102 are examined to identify a content description with highest priority. The verification of conformance with the content access policy includes verifying that the marked data packet has a content description with the highest priority. If the rating is not found to be in conformance with the content access policy, an alternate content is switched to, so that the marked data packet containing content with the highest priority content description is provided to content consumer 108a. For example, an IPTV content consumer, for example content consumer 108a may prefer to watch baseball as a first choice and basketball as a second choice, but he defines highest priority for content that relates to natural disaster news information (for example, hurricane, fire, flooding etc.) that occurs in his region.

In another embodiment of the present invention, the content access policy is to implement parental control. In this case the content access policy for content consumer 108a, where the content consumer can be a child, includes a list of TV ratings and a condition that only the content with a TV rating present in the list is provided to content consumer 108a. The verification of conformance with the content access policy includes looking for the TV rating of the content in the list. If the TV rating is found in the list, the content is provided to the content consumer 108a. Otherwise, the content in form of a marked data packet is dropped.

In yet another embodiment of the present invention, the content access-policy can be dynamic with respect to time. In this case the content access policy for content consumer 108a includes multiple lists of TV ratings, multiple priority lists of content description, or both. The content access policy may further define the correspondence of the multiple lists with the time of day.

In another embodiment of the present invention, the content access policy is to limit the number of content consumers 108 for content with a rating.

In an embodiment of the present invention, various components of access-control module 112 are located at network infrastructure device 106 (as shown in FIG. 1). In various embodiments of the present invention, the components of access-control module 112 can be implemented as software, hardware, firmware, or combinations thereof.

Figure 5:
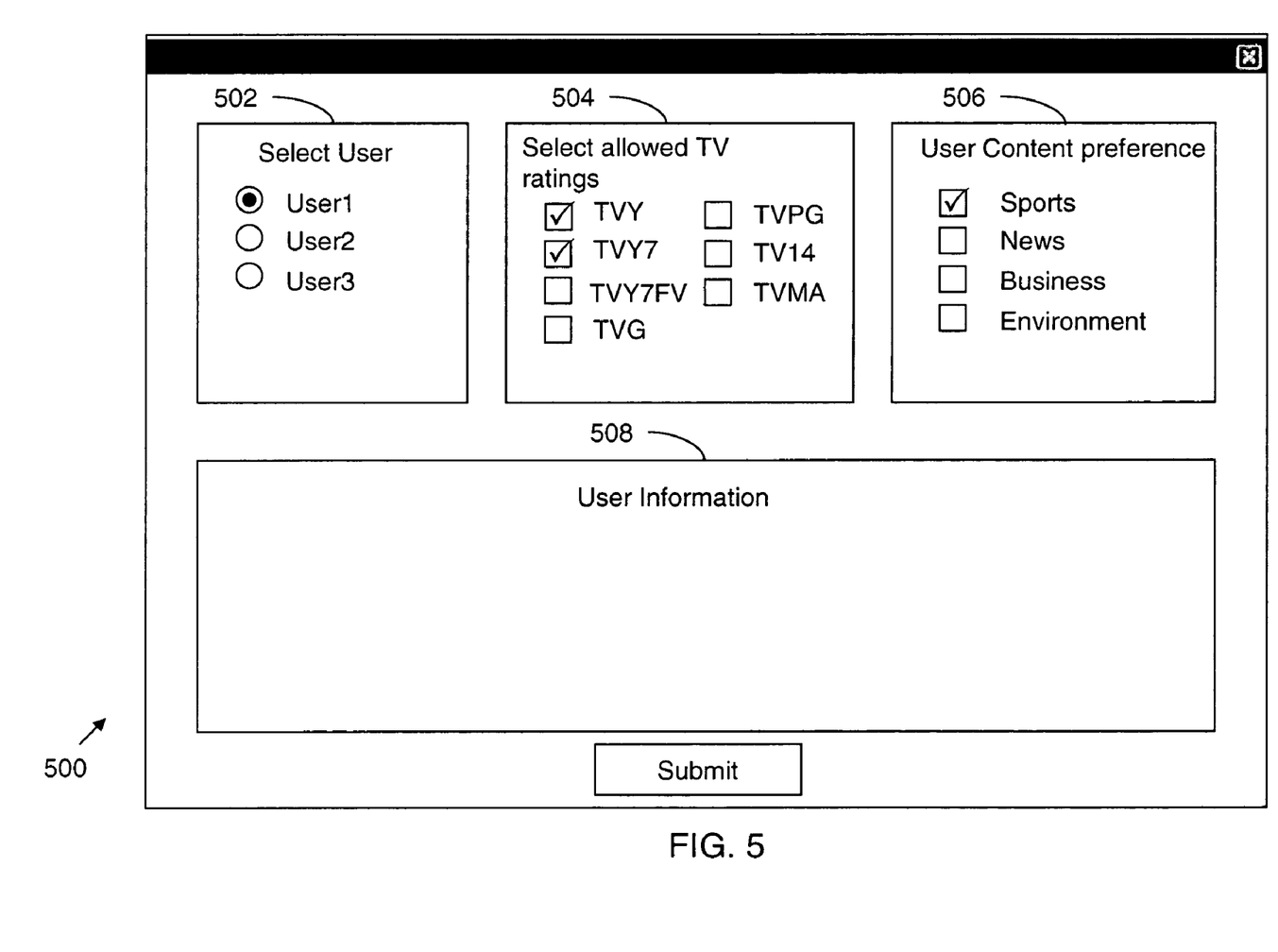
FIG. 5 illustrates a sample Graphical User Interface (GUI) used for defining the content access policy for IPTV content consumers, in accordance with an embodiment of the present invention.

FIG. 5 illustrates a sample Graphical User Interface (GUI) 500 used for defining the content access policy for IPTV content consumers for example, content consumers 108, in accordance with an embodiment of the present invention. GUI 500 includes a user-selection block 502, a TV rating block 504, a content-preference block 506, and a user-information block 508. User-selection block 502 is used to select one of content consumers 108 for which the content access policy is to be defined. In various embodiments of the present invention, content consumers 108 are identified by a username, an IP address, or a MAC address.

In an embodiment of the present invention, radio buttons are provided against the username of each one of content consumers 108. TV rating block 504 is provided to select TV ratings of the programs of the television program guide that are appropriate for the user at the selected content consumer. In an embodiment of the present invention, check-boxes are provided against each TV rating. Content-preference block 506 is provided to select the content preferences of the user at the selected content consumer. In an embodiment of the present invention, check-boxes are provided against various content descriptions. Examples of content description include sports, news, environment, etc. In another embodiment of the present invention, content-preference block 506 provides a hierarchal filter to define the content preferences, for example 'sports/football/49ers/'06'. Various such content preferences can be defined using the hierarchal filter for the user at the selected content consumer. In yet another embodiment of the present invention, content-preference block 506 provides for selecting a priority list for the content where the content with the highest priority is delivered to the user. User-information block 508 provides information about the user at the selected content consumer. The information may include IP address, MAC address, age, name, location, billing information, and other details.

In an embodiment of the present invention, GUI 500 is a web interface provided by network infrastructure device 106. In another embodiment of the present invention, GUI 500 is software installed at the content consumers 108.

It will be apparent to a person skilled in the art that various components/modules disclosed in conjunction with the disclosed embodiments of the present invention are functional entities. One or more of these modules may be implemented at one or more network nodes without deviating from the spirit and scope of the present invention. Further, the functions performed by two or more of these modules may be merged into a single program code for implementation on a network node. Also, the functions performed by one module can be distributed into two or more program code for implementation at different network nodes. Various implementations imbibing the teachings of the present invention will be apparent to one skilled in the art. All these implementation are deemed to lie within the spirit and scope of the present invention.

Figure 6:
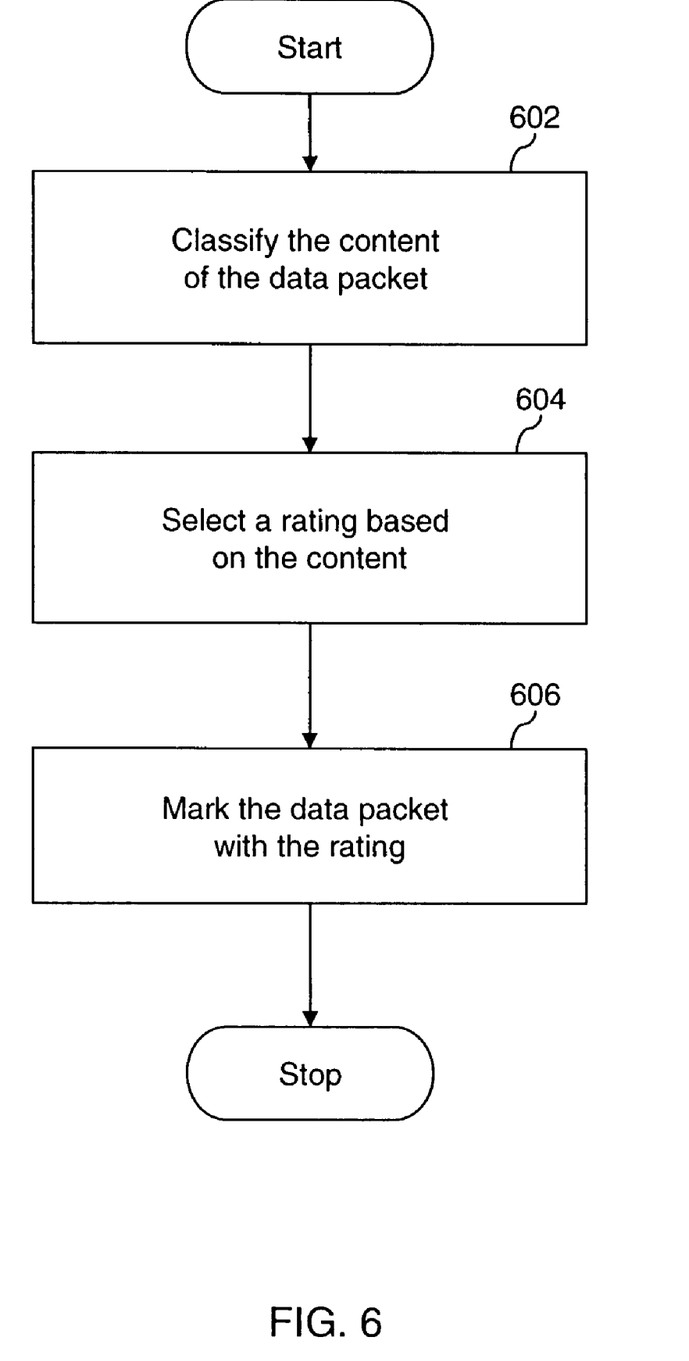
FIG. 6 is a flowchart illustrating a method for marking a data packet, wherein the data packet is delivered via the packet-switched network, in accordance with an embodiment of the present invention.

FIG. 6 is a flowchart illustrating a method for marking the data packet, wherein the data packet is delivered via packet-switched network 104, in accordance with an embodiment of the present invention. At step 602, content distributor 102 classifies the content of the data packet. In an embodiment of the present invention, the content is video and audio content. The classification includes identifying the content of the data packet while the content is being created. For example, if a news clip is being created, the content can be classified as news that is suitable for all ages. At step 604, content distributor 102 selects the rating for the content in the data packet. In an embodiment of the present invention, the rating includes a TV rating and a content description. For example, a TV rating of 'TVG' and content description of 'news' are selected as the rating for the data packet containing the news clip. Thereafter, at step 606, content distributor 102 marks the data packet with the rating. The marking includes storing the rating in the header of the data packet. In an embodiment of the present invention, the rating is stored in numeric fields of the data packet.

Figure 7:
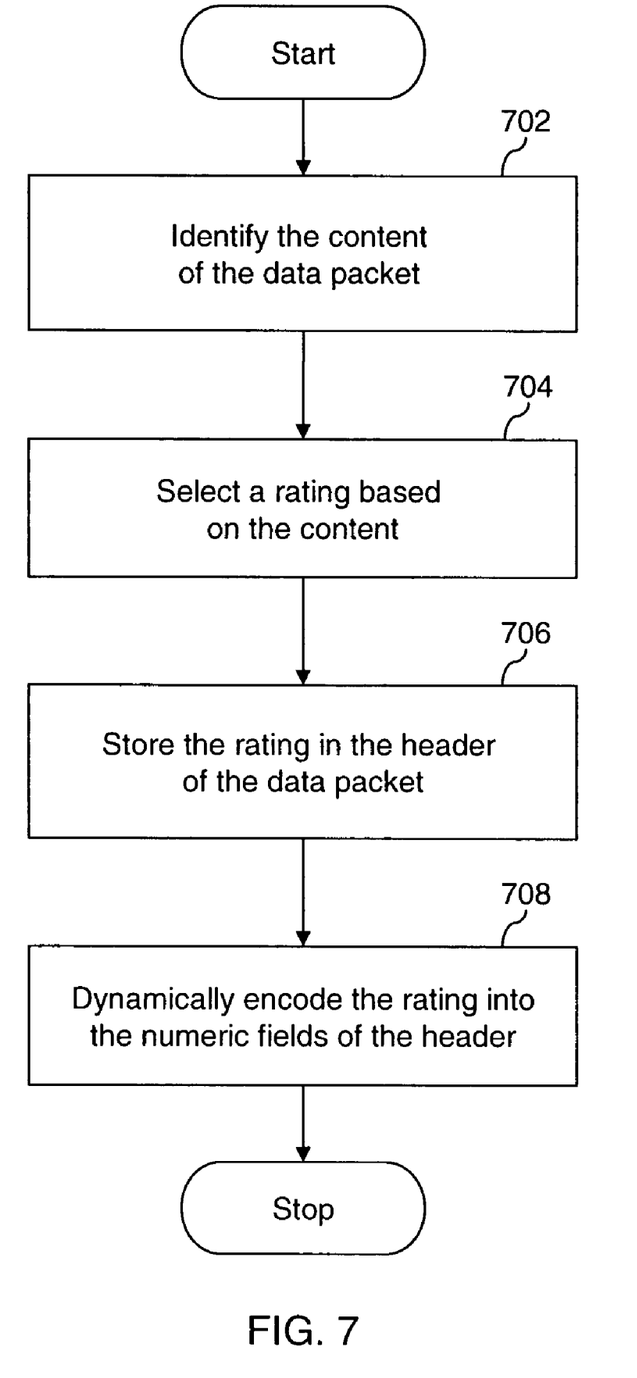
FIG. 7 is a flowchart illustrating a method for marking a data packet, wherein the data packet is delivered via the packet-switched network, in accordance with another embodiment of the present invention.

FIG. 7 is a flowchart illustrating the method for marking the data packet, wherein the data packet is delivered via packet-switched network 104, in accordance with another embodiment of the present invention. At step 702, content distributor 102 identifies the content of the data packet. Thereafter, at step 704, content distributor 102 selects the rating for the content in the data packet. At step 706, content distributor 102 stores the rating, including a TV rating and a content description, in the numeric fields of the header of the data packet. At step 708, content distributor 102 dynamically encodes the rating into the numeric values of the numeric fields. Further, the mapping of the numeric values of the numeric fields to the rating is stored in real-time as a marking scheme at content distributor 102. The marking scheme can be looked up to identify the currently assigned numeric values of the numeric fields for a rating. This would allow content consumers 108a to select a specific type of content.

Figure 8:
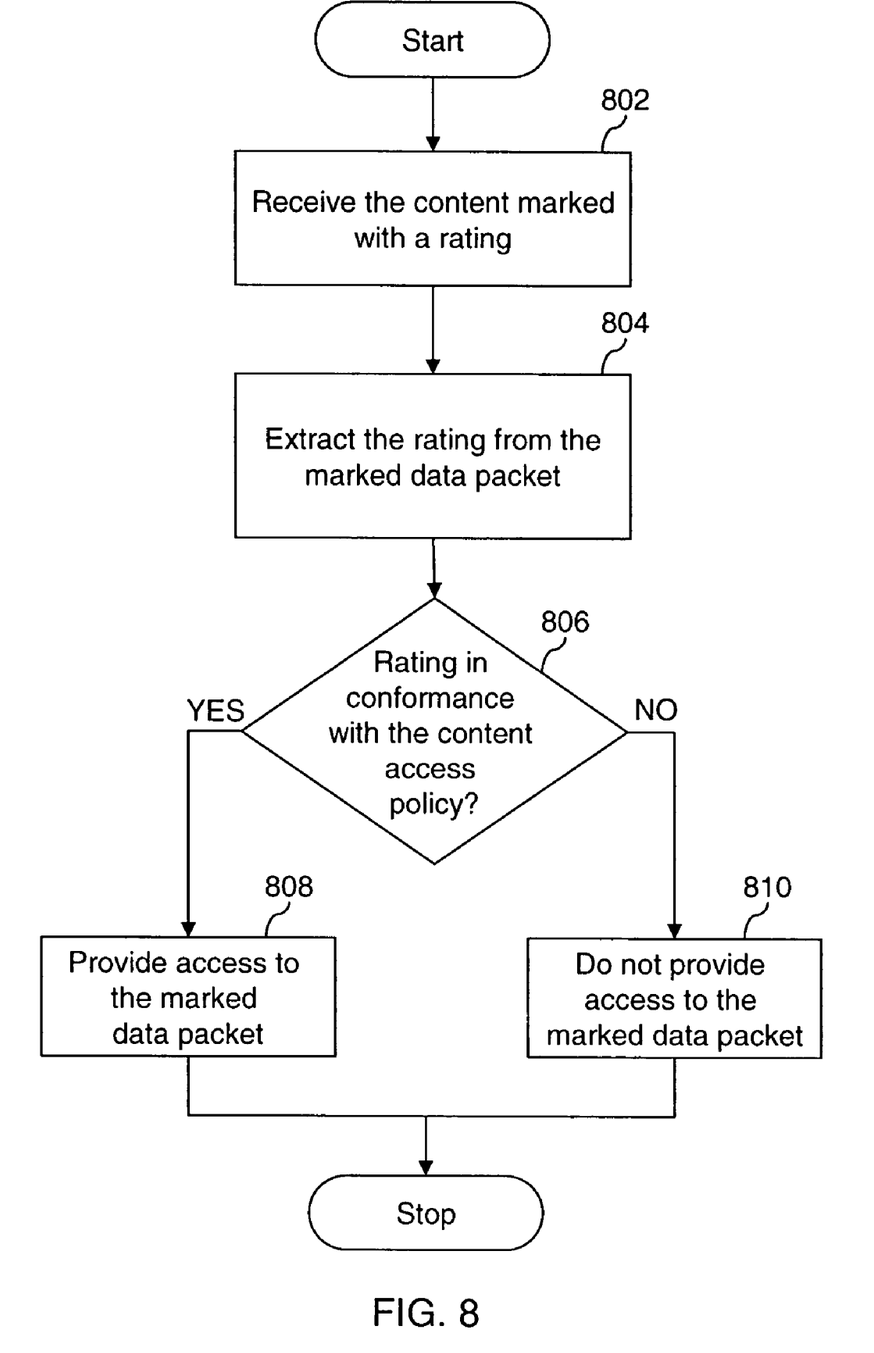
FIG. 8 is a flowchart illustrating a method for accessing content via the packet switched network based on a content access policy, in accordance with an embodiment of the present invention.

FIG. 8 is a flowchart illustrating a method for accessing content via packet-switched network 104 based on the content access policy, in accordance with an embodiment of the present invention. At step 802, network infrastructure device 106 receives the content marked with a rating via packet-switched network 104. The content is received as a packetized stream directed to content consumer 108a. The packetized stream includes data packets marked with a rating. In an embodiment of the present invention, the rating is encoded in the numeric fields of the header of the marked data packets. At step 804, network infrastructure device 106 extracts the rating from the marked data packet. Thereafter, at step 806, network infrastructure device 106 verifies the rating to be in conformance with the content access policy for content consumer 108a. If the rating is found in conformance with the content access policy, network infrastructure device 106 provides content consumer 108a access to the marked data packet at step 808. However, if the rating is not found in conformance with the content access policy, network infrastructure device 106 does not provide content consumer 108a access to the marked data packet at step 810.

Figure 9:
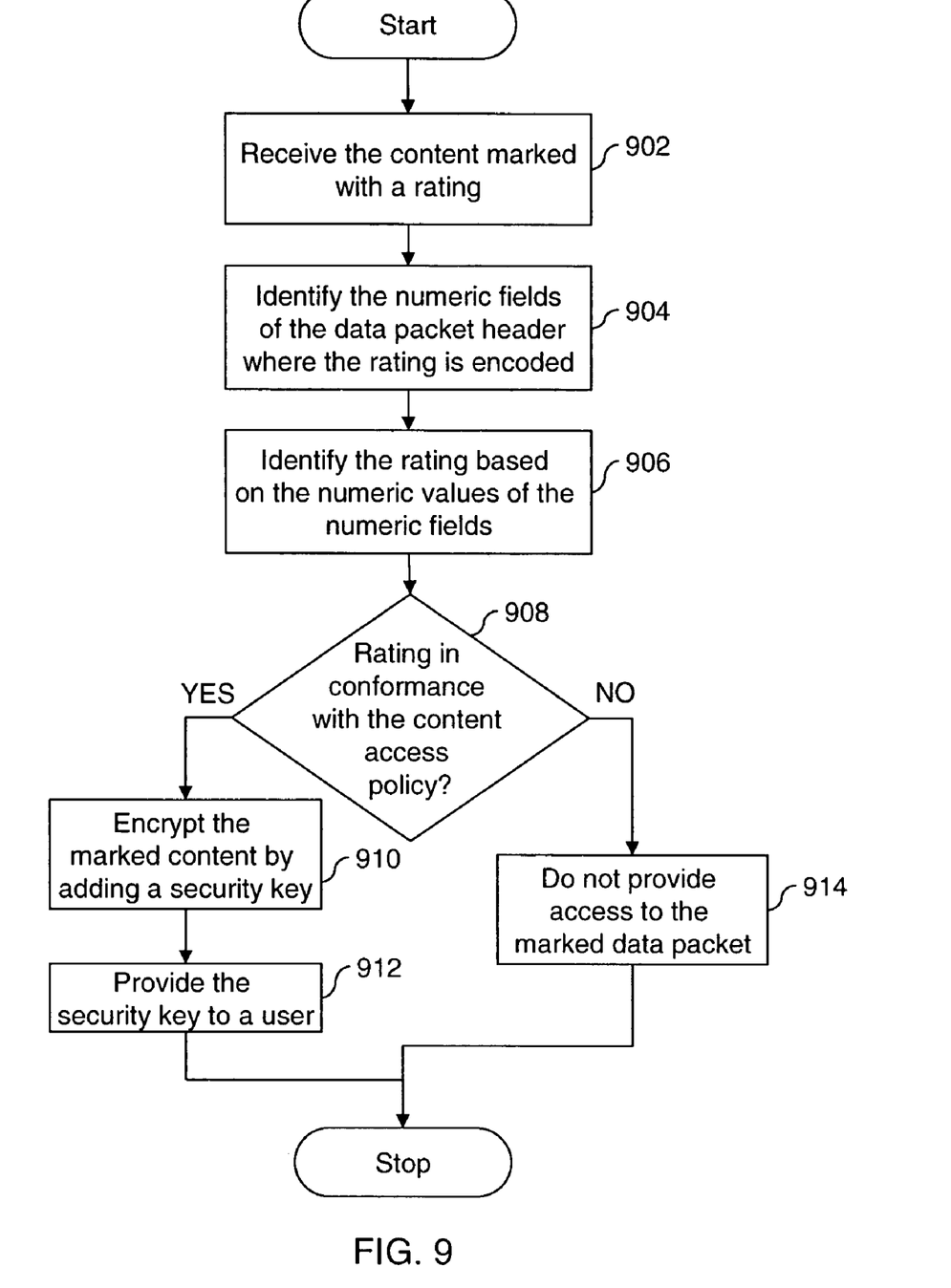
FIG. 9 is a flowchart illustrating a method for accessing content via the packet-switched network based on a content access policy, in accordance with another embodiment of the present invention.

FIG. 9 is a flowchart illustrating a method for accessing content via a packet-switched network 104 based on a content access policy, in accordance with another embodiment of the present invention. At step 902, network infrastructure device 106 receives the content marked with a rating via packet-switched network 104. The content is received as a packetized stream directed to content consumer 108a. The packetized stream includes data packets marked with the rating. In an embodiment of the present invention, the rating is dynamically encoded in the numeric fields of the header of the marked data packet. At step 904, network infrastructure device 106 identifies the numeric fields of the header where the rating is encoded. In an embodiment of the present invention, the identification includes looking up the header of the marked data packet to find the numeric fields. At step 906, network infrastructure device 106 identifies the rating on the basis of the numeric values of the numeric fields. In an embodiment of the present invention, the identification includes looking up database 402, to identify the rating. Thereafter, at step 908, network infrastructure device 106 verifies the rating to be in conformance with the content access policy for content consumer 108a. In an embodiment of the present invention, content access policy is a set of conditions defining the allowed TV ratings and prioritized content descriptions. The verification includes checking that the rating including a TV rating and a content description satisfies the set of conditions. If the rating is found to be in conformance with the content access policy at step 908, at step 910 network infrastructure device 106 encrypts the marked data packet by adding a security key. Thereafter, at step 912, network infrastructure device 106 provides the security key to the user at content consumer 108a so that the user can access the content of the marked data packet. If the rating is not found to be in conformance with the content access policy at step 908, network infrastructure device 106 provides an alternate content to the content consumer 108a by selecting another link provided by content distributor 102. The alternate content is such that packetized stream for the alternate content includes marked data packets with a rating conforming to the content access policy for content consumer 108a. In an embodiment of the present invention, if the rating is not found to be in conformance with the content access policy at 908, network infrastructure device 106 drops the marked data packet thereby denying content consumer 108a access to the marked data packet at step 914.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk13 read only memory (CDROM), compact disk—read/write (CD-R/W) and Digital Versatile Disk (DVD).

Figure 10:
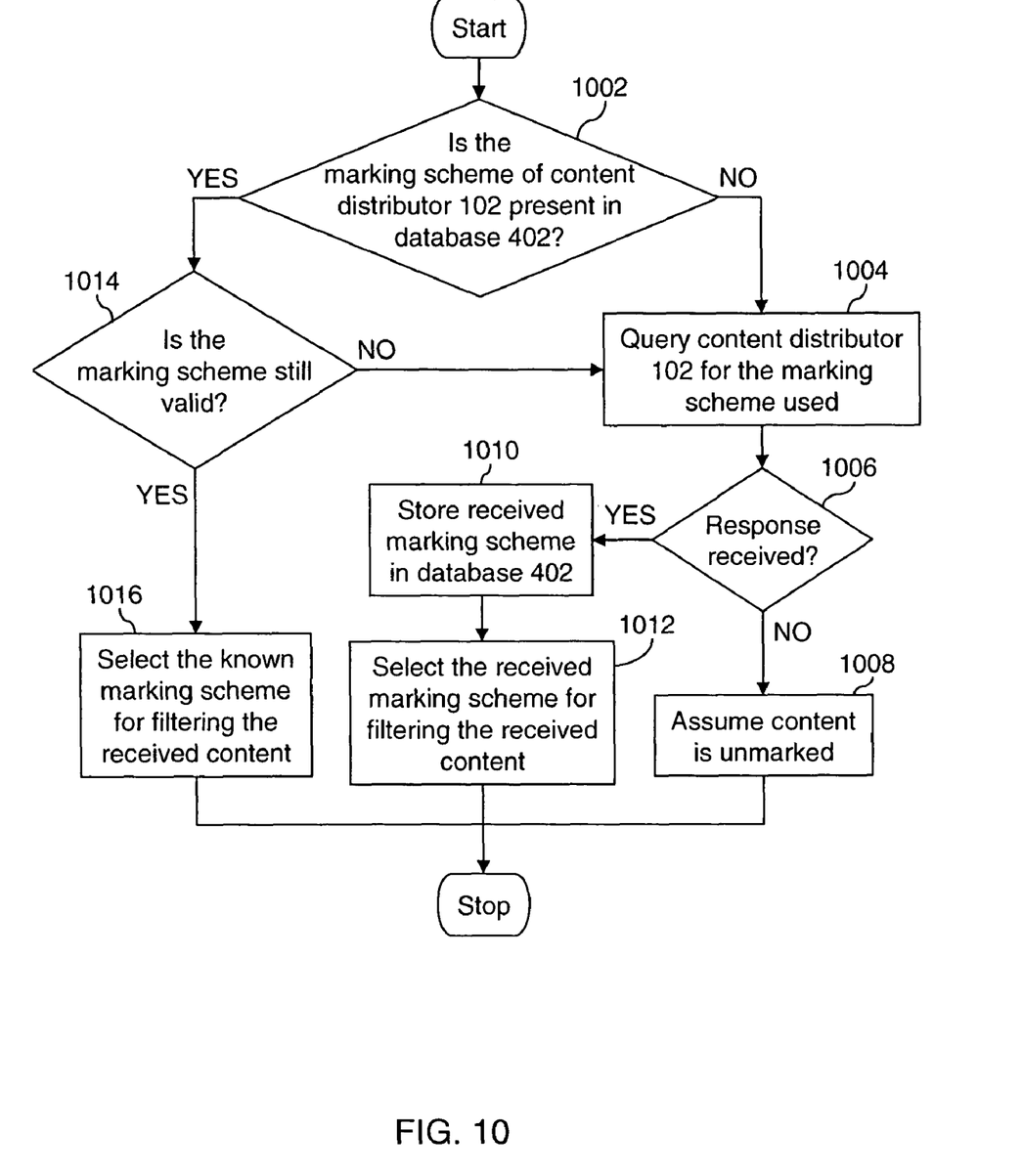
FIG. 10 is a flowchart illustrating a method for detecting the marking scheme used by a content distributor, in accordance with an embodiment of the present invention.

FIG. 10 is a flowchart illustrating a method for detecting the marking scheme used by content distributor 102, in accordance with an embodiment of the present invention. The method network infrastructure device 106 detects the marking scheme used by content distributor 102 by this method.

Network infrastructure device 106 may receive content from a plurality of content distributors. In various embodiments, network infrastructure device 106 maintains the marking scheme used by one or more content distributors in database 402. At step 1002, network infrastructure device 106 checks if the marking scheme of content distributor 102 is present in database 402. If the marking scheme for content distributor 102 is not found in database 402, at step 1004, network infrastructure device 106 queries content distributor 102 for the marking scheme. At step 1006, network infrastructure device 106 checks if content distributor 102 responds to the query. If no response is received, then at step 1008, network infrastructure device 106 assumes that the content is unmarked. On the other hand if content distributor 102 responds with a marking scheme, then at step 1010, network infrastructure device 106 stores the marking scheme in database 402. Further at step 1012, network infrastructure device 106 selected the received marking scheme for filtering the content received from content distributor 102.

If on the other hand, the marking scheme of content distributor 102 is found in database 402 at step 1002, the method proceeds to step 1014. In various embodiments, content distributor 102 may dynamically update its marking scheme. Therefore, marking schemes may be associated with a validity period during which the marking scheme does not change. At step 1014, the network infrastructure device 106 checks if the marking scheme found in database 402 is still valid. If the marking scheme is found valid, then at step 1016 the marking scheme from database 402 is selected for filtering content received from content distributor 102. On the other hand, if the marking scheme is found to be invalid, the method proceeds to step 1004 to query content distributor 102 for the latest valid marking scheme.

While the method of FIG. 10 has been described with reference to network infrastructure device 106, it would be apparent to one skilled in the art that any network element communicatively coupled with a content distributor 102 may employ the method to detect the marking scheme used by the content distributor 102. The network element may be communicatively coupled with the content distributor 102 through, for example, packet-switched network 104.

In another embodiment of the present invention, content distributor 102 may periodically broadcast its marking scheme. The broadcast of the marking scheme may be done from a pre-defined port for ease of identification, for example, from port zero of content distributor 102.

Figure 11:
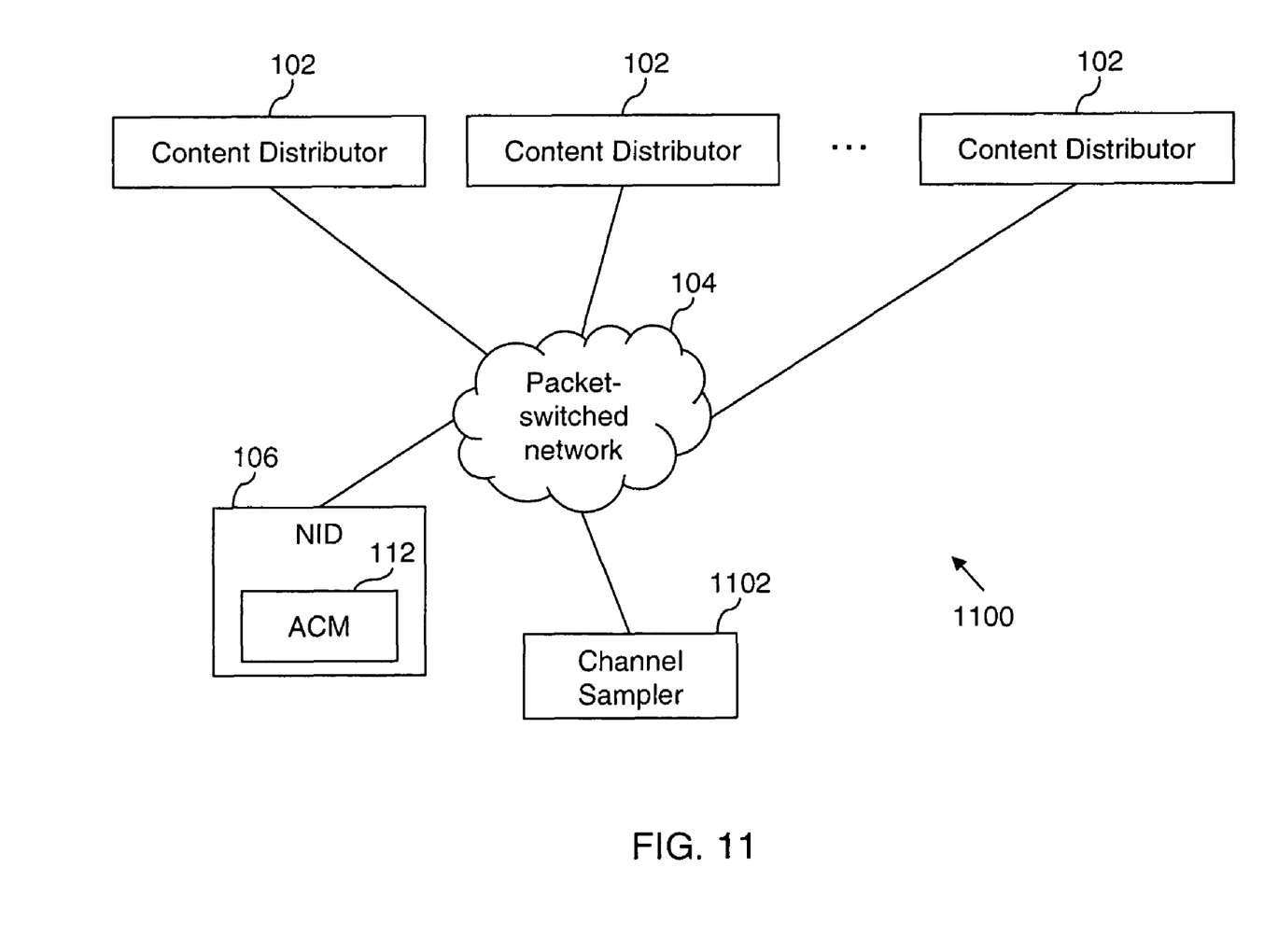
FIG. 11 shows a system for sampling content distributed by a plurality of content distributors, in accordance with one embodiment of the present invention.

FIG. 11 shows a system 1100 for sampling content distributed by a plurality of content distributors 102, in accordance with one embodiment of the present invention. The figure shows a channel sampler 1102 connected with packet-switched network 104. As the number of different types of content distributed by content distributors 102 is increases, it is increasingly difficult for network infrastructure device 106 to traverse the content. Therefore, a content consumer connected to network infrastructure device 106 may find it difficult to locate content of choice manually. In one embodiment of the present invention, network infrastructure device 106 may sample the available content and identify the content of interest to the content consumer or appropriate to the consumer.

In one embodiment of the present invention, channel sampler 1102 samples content distributed by the plurality of content distributors 102 to make the process of choosing from the available content manageable. Channel sampler 1102 is a proxy device connected to the network backbone—where it can have direct simultaneous access to content from the plurality of content distributors 102. Channel sampler 1102 samples and selects content to be delivered to at least one network infrastructure device 106. In another embodiment, channel sampler 1102 sends a sub-sampling based on 1-in-N packets from available content from content distributors 102 to network infrastructure device 106 for examination for appropriate or interesting content. Further, channel sampler 1102 may provide network infrastructure device 106 a sub-selection from available content that only includes content in the content consumer's native language, for example English. The content consumer may select a native language while configuring network interface device 106.

In the foregoing specification, specific embodiments of the present invention have been described. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

The invention claimed is:

1. A method comprising:
   programming into a network infrastructure device a content access policy for a content consumer device;
   receiving content data packets that are addressed to the content consumer device via a packet switched network at the network infrastructure device,
   wherein each content data packet is encoded with a content classification and rating in an address region of the content data packet headers, wherein the content classification and rating are encoded within a source address, a source port number, a destination port number, and a destination address of a content packet header;
   extracting the content classification and rating from each encoded content data packet;
   verifying that the content classification and rating for each encoded content data packet conforms with the content access policy; and
   providing access to each encoded content data packet upon verifying that each encoded content data packet conforms with the content access policy.

2. The method according to claim 1, wherein receiving comprises receiving encoded content data packets in accordance with the Internet Protocol Suite.

3. The method according to claim 1, wherein programming comprises programming the content access policy for the content consumer device via the network infrastructure device.

4. The method according to claim 1, wherein the encoded content classification and rating comprise at least one of a television rating and a content description that indicates the subject matter contained in the encoded content data packets.

5. The method according to claim 1, wherein extracting further comprises:
   identifying one or more numeric fields in the address region of each content data packet in which the content classification and rating is encoded; and
   identifying the content classification and rating based on values of the one or more numeric fields.

6. The method according to claim 1, further comprising encrypting the content data packets using a security key.

7. The method according to claim 6, wherein providing access to each content data packet upon verification comprises providing access to the security key.

8. A method comprising:
   identifying a content classification of the content of a data packet using a content rating module of a content distribution device, wherein the data packet comprises a header that enables the data packet to be transmitted over a packet-switched network;
   selecting a rating based on the content of the data packet; and
   encoding the content classification and the rating within a source address, a source port number, a destination port number, and a destination address of a data packet header.

9. The method according to claim 8, further comprising transmitting the content data packet over the packet switched network.

10. The method according to claim 8, wherein encoding comprises encoding the content classification and the rating in the data packet header comprising an Internet Protocol (IP) header.

11. The method according to claim 10, wherein encoding comprises dynamically encoding the content classification and rating into numeric fields of the data packet IP header.

12. The method according to claim 10, wherein encoding comprises sub-dividing an address region of the header into a predetermined number of bit fields that may be used to classify content according to one or more sub-classifications comprising content rating, subject matter type, subject matter sub-types, and a geographic location associated with a content type or sub-type to form a hierarchical content classification.

13. An apparatus comprising:
    a network interface receiving module configured to receive content data packets that are addressed to a content consumer device via a packet switched network, wherein each content data packet is encoded with a content classification and rating in an address region of a header of the content data packets, wherein the content classification and rating are encoded within a source address, a source port number, a destination port number, and a destination address of a content packet header;
    an access control device extraction module configured to:

extract the content classification and rating from each content data packet;
verify that the content classification and rating for each content data packet conforms with the content access policy; and
provide access to each content data packet upon verifying that each content data packet conforms with the content access policy.

14. The apparatus according to claim 13, wherein the access control device is further configured to encrypt the content data packets.

15. The apparatus according to claim 14, wherein the access control device comprises a security-key provider configured to provide access to the security key.

16. The apparatus according to claim 13, wherein the access control device is further configured to switch to alternate content when the content classification of the content data packet does not conform with the content access policy.

17. The apparatus according to claim 13, wherein the access control device extraction module is configured to extract the content classification and rating comprising at least one of a television rating and a content description that indicates the subject matter contained in the content data packets.

18. The apparatus according to claim 13, wherein the access control device is further configured to generate a user interface that is configured to allow the content access policy to be defined for the access control device and to generate a hierarchical filter that defines content preferences based on one or more sub-classifications contained in numeric fields of the address region of the corresponding content data packet headers.

19. The apparatus according to claim 18, wherein the access control device is configured to generate the user interface comprising one of a Graphical User Interface (GUI) and a Command Line Interface (CLI).

20. The apparatus according to claim 13, wherein the access control device is further configured to extraction module comprises:
identify one or more numeric fields in the address region of the content data packet headers in which the content classification and rating are encoded; and
identify the content classification and rating based upon the value of the one or more numeric fields.

21. The apparatus according to claim 20, wherein the access control device is further configured to interface with a database to lookup content ratings, classifications, and sub-classifications that correspond to the one or more numeric fields.

22. The apparatus according to claim 21, wherein the access control device is configured to interface with the database comprising one of a dynamic database, a content addressable database, and a web service based database.

23. The apparatus according to claim 13, wherein the network interface is configured to receive the content data packets comprising Internet Protocol data packets.

24. A non-transitory computer readable medium storing instructions that, when executed by a processor, cause the processor to:
program a content access policy for a content consumer device;
receive content data packets that are addressed to the content consumer device via a packet switched network, wherein the content classification and rating are encoded within a source address, a source port number, a destination port number, and a destination address of a header of a content data packet;
extract the content classification and rating from each encoded content data packet;
verify that the content classification and rating for each encoded content data packet conforms with the content access policy; and
provide access to each encoded content data packet upon verifying that each encoded content data packet conforms with the content access policy.

25. The method of claim 3, further comprising defining the content access policy using a Graphical User Interface (GUI) or a Command Line Interface (CLI), wherein defining comprises selecting a user and one or more content access parameters for the selected user according to a hierarchical filter that defines content preferences based on one or more content sub-classifications.

26. The method of claim 25, and further comprising displaying on a display device selection options for the one or more content access parameters comprising user identifier, a plurality of content classifications, content sub-classifications and a plurality of program ratings, and wherein selecting the one or more content access parameters comprises selecting, for a selected one of a plurality of users, at least one allowed program rating among the plurality of program ratings, a content preference among the plurality of content classifications or content sub-classifications, and user information for the selected user, wherein the user information includes one or more of Internet Protocol (IP) address, Media Access Control (MAC) address, age, name, location and billing information.

27. The method of claim 8, wherein identifying comprises identifying the content classification using image recognition.

28. The method of claim 11, wherein dynamically encoding comprises dynamically updating the rating using a dynamic content classification scheme and further comprising:
querying a content distributor to determine whether or not the dynamic content classification scheme is still valid; and
in response to determining that the dynamic content classification scheme is not valid, querying the content distributor for a current content classification scheme.

* * * * *